United States Patent
Choi et al.

(10) Patent No.: US 11,507,960 B2
(45) Date of Patent: Nov. 22, 2022

(54) SYSTEM AND METHOD FOR HANDLING LOST ITEM IN AUTONOMOUS VEHICLE

(71) Applicants: HYUNDAI MOTOR COMPANY, Seoul (KR); KIA MOTORS CORPORATION, Seoul (KR)

(72) Inventors: Eun Young Choi, Seoul (KR); Dong Il Yang, Seoul (KR); Jin Su Jeong, Suwon-si (KR); Ki Seok Seong, Cheonan-si (KR); Min Sang Yu, Hwaseong-si (KR); Hyeong Jin Ham, Seongnam-si (KR); Rosali Sun Pyun, Seongnam-si (KR); Pil Cheon Jang, Seongnam-si (KR); Woo Jin Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 267 days.

(21) Appl. No.: 16/891,869

(22) Filed: Jun. 3, 2020

(65) Prior Publication Data
US 2021/0279740 A1 Sep. 9, 2021

(30) Foreign Application Priority Data
Mar. 3, 2020 (KR) .................. 10-2020-0026645

(51) Int. Cl.
G08B 21/24 (2006.01)
G06Q 30/00 (2012.01)
(Continued)

(52) U.S. Cl.
CPC ........... *G06Q 30/016* (2013.01); *G01G 19/12* (2013.01); *G01S 15/04* (2013.01); *G01S 17/04* (2020.01); *G06K 9/6201* (2013.01); *G06Q 20/085* (2013.01); *G06Q 50/30* (2013.01); *G06V 20/593* (2022.01); *G08B 21/24* (2013.01);
(Continued)

(58) Field of Classification Search
CPC .... G06Q 30/016; G06Q 20/085; G06Q 50/30; G06Q 2240/00; G01G 19/12; G01S 15/04; G01S 17/04; G06K 9/6201; G08B 21/24; G08G 1/20; H04W 4/44; G05D 1/0088; G05D 2201/0213; B60W 40/08; B60W 2420/42
See application file for complete search history.

(56) References Cited

U.S. PATENT DOCUMENTS

2021/0209517 A1* 7/2021 Shimodaira ............ G06Q 50/30

FOREIGN PATENT DOCUMENTS

JP 2006338535 * 12/2006
KR 20210101367 * 8/2021 ............. G06V 10/10

* cited by examiner

*Primary Examiner* — Hongmin Fan
(74) *Attorney, Agent, or Firm* — Morgan, Lewis & Bockius LLP

(57) ABSTRACT

A system for handling a lost item in an autonomous vehicle and a server. The vehicle includes a vision sensor configured to respectively capture a first vehicle interior image and a second vehicle interior image when a passenger boards and alights from the vehicle. The vehicle is configured to transmit the captured first vehicle interior image and second vehicle interior image to the server. The server is configured to compare the first vehicle interior image with the second vehicle interior image and transmit lost item information to the passenger when the lost item in the vehicle is sensed.

23 Claims, 6 Drawing Sheets

(51) Int. Cl.
   *G08G 1/00* (2006.01)
   *H04W 4/44* (2018.01)
   *G06K 9/62* (2022.01)
   *G06Q 50/30* (2012.01)
   *G06Q 20/08* (2012.01)
   *G01G 19/12* (2006.01)
   *G01S 15/04* (2006.01)
   *G01S 17/04* (2020.01)
   *G06V 20/59* (2022.01)
   *G05D 1/00* (2006.01)
   *G06V 10/75* (2022.01)

(52) U.S. Cl.
   CPC ............... *G08G 1/20* (2013.01); *H04W 4/44* (2018.02); *G05D 1/0088* (2013.01); *G05D 2201/0213* (2013.01); *G06Q 2240/00* (2013.01); *G06V 10/759* (2022.01)

SYSTEM AND METHOD FOR HANDLING LOST ITEM IN AUTONOMOUS VEHICLE

CROSS-REFERENCE TO RELATED APPLICATION

This application claims the benefit of priority to Korean Patent Application No. 10-2020-0026645, filed in the Korean Intellectual Property Office on Mar. 3, 2020, the entire contents of which are incorporated herein by reference.

TECHNICAL FIELD

The present disclosure relates to a system and a method for handling a lost item in an autonomous vehicle.

BACKGROUND

As an autonomous driving technology is developed, a shared mobility service such as a robot taxi and a purpose built vehicle (PBV) has emerged. Because the shared mobility service targets a large number of unspecified individuals, protection of personal information of a user has become an issue. During a service of a vehicle that may be used by a large number of unspecified individuals, such as the robot taxi or the PBV, the vehicle can be operated unmanned without a separate administrator, although management of a lost item of an occupant in the vehicle, hygiene of the vehicle, and the like is necessary.

SUMMARY

The present disclosure has been made to solve the above-mentioned problems occurring in the prior art while advantages achieved by the prior art are maintained intact.

An aspect of the present disclosure provides a system and a method for handling a lost item in an autonomous vehicle that monitor an interior of the vehicle so as not to violate privacy regulations when providing a shared mobility service to sense the lost item, and take follow-up measures for the sensed lost item.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for handling a lost item in an autonomous vehicle includes the vehicle including a vision sensor configured to respectively capture a first vehicle interior image and a second vehicle interior image when a passenger boards and alights from the vehicle and transmit the captured first vehicle interior image and second vehicle interior image to a server, and the server configured to compare the first vehicle interior image with the second vehicle interior image and to transmit lost item information to a user terminal associated with the passenger when the lost item in the vehicle is sensed.

The vehicle may be configured to determine, based on whether the passenger agreed, a time point before the boarding or after the boarding as a first capturing time point, and a time point after the alighting or before the alighting as a second capturing time point.

The vehicle may be configured to blur or delete a region matching a boarding location of another passenger in the first vehicle interior image in a state where the another passenger is boarded the vehicle at the first capturing time point.

The vehicle may be configured to blur or delete a region matching a boarding location of another passenger in the second vehicle interior image in a state where the another passenger is boarded the vehicle at the second capturing time point.

The vehicle may be configured to determine whether the vehicle has arrived at a calling location based on a vehicle location.

The vehicle may be configured to determine whether the vehicle has arrived at the calling location additionally based on at least one of a vehicle speed and/or brake state information.

The vehicle may be configured to sense a time point before the boarding of the passenger based on door status information.

The vehicle may be configured to sense the passenger based on information provided by at least one of a weight sensor, the vision sensor, a camera, an ultrasonic sensor, and/or a radar.

The vehicle may be configured to determine service end of the passenger based on completion of service fee payment and occupant location information.

The vehicle may be configured to sense a time point after the alighting of the passenger based on at least one of door status information, an external button signal, information provided by a weight sensor, information provided by an ultrasonic sensor, information provided by a radar, and/or information provided by the vision sensor.

The server may be configured to transmit the lost item information to a business operator when the lost item in the vehicle is sensed.

The lost item in the vehicle may be at least one of belongings of the passenger, a trash, and/or a garbage.

According to an aspect of the present disclosure, a method for handling a lost item in an autonomous vehicle includes a first step of receiving, by a server, a first vehicle interior image and a second vehicle interior image respectively captured through a vision sensor when a passenger boards and alights from the vehicle, a second step of comparing, by the server, the first vehicle interior image with the second vehicle interior image and to sense the lost item in the vehicle, and a third step of transmitting, by the server, lost item information to a user terminal associated with the passenger.

The first step may include determining a time point before the boarding or after the boarding as a first capturing time point based on whether the passenger agreed to be captured, and determining a time point after the alighting or before the alighting as a second capturing time point based on whether the passenger agreed to be captured.

The first step may include blurring or deleting a region matching a boarding location of another passenger in the first vehicle interior image when the another passenger exists in the vehicle at the first capturing time point.

The first step may include blurring or deleting a region matching a boarding location of another passenger in the second vehicle interior image in a state where the another passenger is boarded the vehicle at the second capturing time point.

The first step may include determining, by the vehicle, whether the vehicle has arrived at a calling location based on a vehicle location.

The first step further may include determining, by the vehicle, whether the vehicle has arrived at the calling location additionally based on at least one of a vehicle speed and/or brake state information.

The first step may include sensing, by the vehicle, a time point before the boarding of the passenger based on door status information.

The first step may include sensing, by the vehicle, the passenger based on information provided by at least one of a weight sensor, the vision sensor, a camera, an ultrasonic sensor, and/or a radar.

The first step may include determining, by the vehicle, service end of the passenger based on completion of service fee payment and occupant location information.

The first step may further include sensing a time point after the alighting of the passenger, by the vehicle, based on at least one of door status information, an external button signal, information provided by a weight sensor, information provided by an ultrasonic sensor, information provided by a radar, and/or information provided by the vision sensor.

The first step may further include transmitting, by the server, the lost item information to a business operator when the lost item in the vehicle is sensed.

The lost item in the vehicle may be at least one of belongings of the passenger, a trash, and/or a garbage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
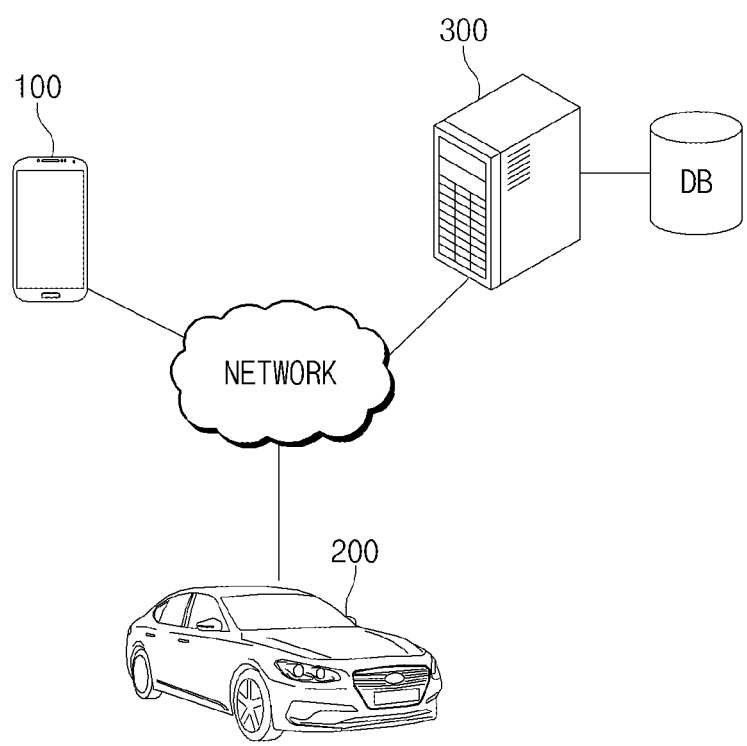
FIG. 1 is a configuration diagram illustrating a system for handling a lost item in an autonomous vehicle according to one embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
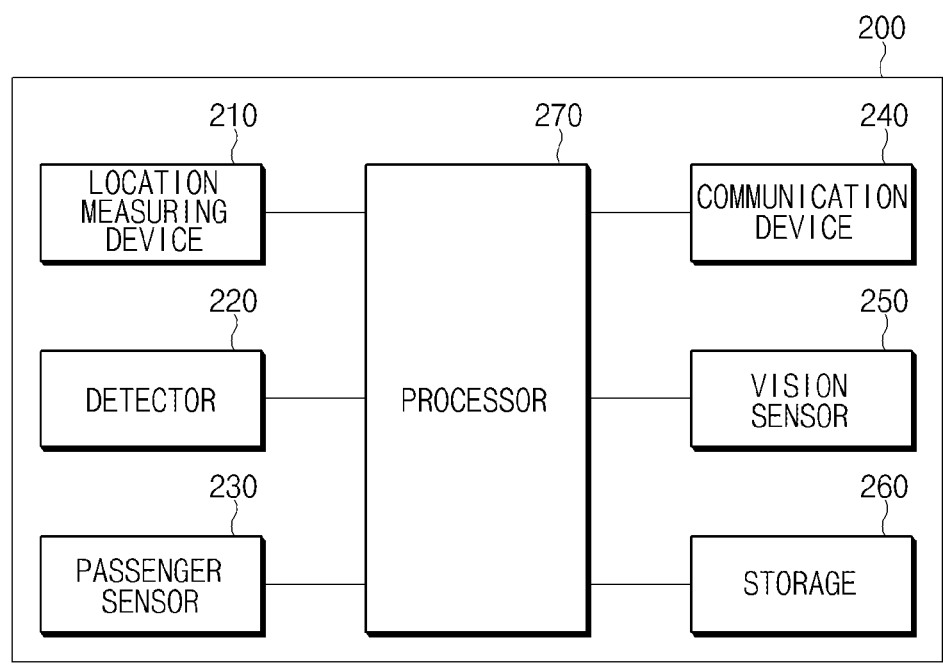
FIG. 2 is a block diagram of a vehicle illustrated in FIG. 1.

FIG. 1 is a configuration diagram illustrating a system for handling a lost item in an autonomous vehicle according to one embodiment of the present disclosure. Further, FIG. 2 is a block diagram of a vehicle illustrated in FIG. 1. In the present embodiment, a case in which a shared mobility service is provided using an autonomous vehicle (e.g., a robot taxi, a PBV, and the like) will be described as an example.

A system for handling a lost item in an autonomous vehicle includes a user terminal 100, a vehicle 200, and a server 300.

The user terminal 100 is a device possessed by a user (e.g., a person to be boarded, a person who made a reservation, a passenger, an owner, and an occupant) and capable of wireless or wired communication. The user terminal 100 may be implemented as a device such as a smartphone, a tablet, a personal digital assistant (PDA), a portable multimedia player (PMP), or a laptop computer. Although not shown in the drawing, such a user terminal 100 includes a communication module, a user input module, an output module, a processor, and a memory.

The user terminal 100 may make a reservation of use of the shared mobility service, that is, use of a shared vehicle, on the server 300 through specific software or an application provided by a service provider. That is, the user terminal 100 requests a boarding reservation (a vehicle call) to the server 300 based on a user input. When requesting the boarding reservation, the user terminal 100 transmits boarding reservation information including a boarding location (e.g., a riding location and a departure point), a destination (e.g., an alighting location), a boarding time, information about the person who made the reservation (e.g., a name, a contact address, and the like), the number of people to be boarded, whether the user agreed to be photographed, or payment information (including a payment scheme or payment means), and the like.

When the user (the person who made the reservation) boards or gets off from the vehicle 200, the user terminal 100 may transmit user identification information, for example, a user ID, a phone number, an email address, payment scheme information or a terminal unique number, and the like to the vehicle 200. The user identification information is used by the vehicle 200 to identify a boarding/alighting passenger.

The vehicle 200, which is the shared vehicle that may be used by a large number of unspecified individuals, may be implemented as the robot taxi or the purpose built vehicle (PBV) capable of autonomous driving. Although only one vehicle is illustrated in FIG. 1, two or more shared vehicles may exist. Referring to FIG. 2, the vehicle 200 includes a location measuring device 210 (or a location sensing device), a detector 220, a passenger sensor 230, a communication device 240, a vision sensor 250, storage 260, and a processor 270.

The location measuring device 210 measures or senses a current location of the vehicle 200. The location measuring device 210 measures a vehicle location using at least one of positioning techniques such as a global positioning system (GPS), a dead reckoning (DR), a differential GPS (DGPS), or a carrier phase differential GPS (CDPGPS).

The detector 220 obtains vehicle information from sensors mounted on the vehicle or an electronic control unit (ECU). The vehicle information may include a vehicle speed, brake status information, or door status information (e.g., whether a door open button is manipulated or whether a door lever is manipulated). The sensors may be implemented as a speed sensor, a brake pedal location sensor, a door sensor, a weight sensor, or a vision sensor. The electronic control unit may be implemented as a vehicle door system, an electronic stability control (ESC), a transaction control system (TCS), or an antilock brake system (ABS).

The passenger sensor 230 senses the passenger who boarded the vehicle 200 utilizing a passenger sensing technology using the weight sensor, the vision sensor (e.g., a camera), an ultrasonic sensor, or a radar. The passenger sensor 230 may obtain a boarding (seating) location of the passenger (that is, the occupant) who boarded (rode) the vehicle or the number of boarded people. The passenger sensor 230 senses the passenger (the user) boarding or alighting from the vehicle 200. In addition, the passenger sensor 230 may sense a seat change of the passenger in the vehicle 200.

The communication device 240 allows the vehicle 200 to perform wireless communication with the user terminal 100 or the server 300. The communication device 240 may use a communication technology such as a Wi-Fi, a Bluetooth, a near field communication (NFC), a long term evolution (LTE), an international mobile telecommunication (IMT)-2020, an ethernet, or a vehicle to everything (V2X), and the like.

The vision sensor 250 is installed interior (indoor) of the vehicle 200 and captures a preset passenger boarding space. The vision sensor 250 may be implemented as at least one image sensor among a charge coupled device (CCD) image sensor, a complementary metal oxide semi-conductor (CMOS) image sensor, a charge priming device (CPD) image sensor, or a charge injection device (CID) image sensor. The vision sensor 250 may obtain an image of an entirety of the interior (indoor) of the vehicle through an image sensor installed alone at a front portion of the interior of the vehicle 200, or obtain a vehicle interior image for each seat through each image sensor installed for each seat. When the image sensor is installed for each seat, each lens positioned at a front portion of each image sensor is installed to face a matching seat. The vision sensor 250 may include an image processor that performs image processing such as noise removal, color reproduction, file compression, image quality adjustment, saturation adjustment, and the like on the image obtained through the image sensor.

The storage 260 may be mounted on the processor 270 and store software programmed to perform a preset operation. The storage 260 may store map data, and the storage 260 may store the image(s) obtained by the vision sensor 250. The storage 260 may be implemented as at least one of storage media (recording media) such as a flash memory, a hard disk, a secure digital Card (SD card), a random access memory (RAM), a static random access memory (SRAM), a read only memory (ROM), a programmable read only memory (PROM), an electrically erasable and programmable ROM (EEPROM), an erasable and programmable ROM (EPROM), or a register.

The processor 270 controls an overall operation (e.g., the autonomous driving) of the vehicle 200. The processor 270 may be implemented as at least one of an application specific integrated circuit (ASIC), a digital signal processor (DSP), a programmable logic device (PLD), a field programmable gate array (FPGA), a central processing unit (CPU), a microcontroller, or a microprocessor.

The processor 270 receives vehicle call information through the communication device 240. The vehicle call information includes a calling location (a calling place), an alighting location, the boarding time, the number of people to be boarded, whether the user agreed to be captured, the payment information, or the information about the person who made the reservation. The processor 270 may determine a capturing time point based on whether the user agreed to be captured in the vehicle call information. In other words, when the person who made the reservation (the user) agreed to be captured, the processor 270 may determine a time point immediately after the boarding as a capturing time point when boarding (a first capturing time point), and determine a time point immediately before the alighting as a capturing time point when alighting (a second capturing time point). In addition, when the person who made the reservation (the user) didn't agree to be captured, the processor 270 may determine a time point immediately before the boarding as the first capturing time point, and determine a time point immediately after the alighting as the second capturing time point. A time point "immediately" before or after an event may mean that a time point is a predetermined period before or after such an event. The predetermined period may be preset by the manufacturer of the vehicle, or be set by the administrator of the vehicle.

The processor 270 sets the calling location included in the vehicle call information as a destination and searches for a traveling route to the destination based on the vehicle location measured by the location measuring device 210 and the map data stored in the storage 260. The processor 270 controls the autonomous driving of the vehicle 200 along the found traveling route. The processor 270 compares the vehicle location measured by the location measuring device 210 with the calling location while the vehicle 200 travels autonomously. The processor 270 determines whether the vehicle 200 has reached the calling location based on the comparison result of the vehicle location and the calling location. In addition, when the vehicle 200 reaches the calling location, the processor 270 determines whether the vehicle 200 has reached the calling location by determining whether the vehicle 200 is stopped based on the vehicle speed or the brake status information. When the vehicle 200 is stopped at the calling location, the processor 270 may determine whether there is the person who made the reservation around the vehicle 200 through wireless communication with the user terminal 100.

When the person who made the reservation located around the vehicle 200 is identified, the processor 270 determines whether the passenger is before boarding. The processor 270 may sense the time point immediately before the boarding of the passenger (before the boarding of the passenger) based on the manipulation information of the door lever or the door open button, that is, the door status information. In addition, the processor 270 may use the passenger information obtained by the passenger sensor 230 to determine whether the passenger is before boarding. When the passenger is before boarding, the processor 270 operates the vision sensor 250 to capture the image of the interior of the vehicle 200 (a first vehicle interior image). When there is another occupant (passenger) in the vehicle 200 before the boarding of the passenger, the processor 270 blocks, blurs, or deletes a region matching a boarding location of the corresponding another occupant in the first vehicle interior image. When the passenger agreed to be captured, the processor 270 obtains the first vehicle interior image through the vision sensor 250 after the passenger boards the vehicle 200. In this connection, the processor 270 selectively obtains an image of a seating space (the boarding space) of the boarded passenger (the first vehicle interior image). In other words, when there is another passenger other than the boarded passenger in the vehicle 200, the processor 270 may protect personal information of another passenger by blurring or deleting the region matching the boarding location of the corresponding another passenger in the first vehicle interior image captured by the vision sensor 250. The processor 270 transmits the first vehicle interior image to the server 300 through the communication device 240.

When the passenger boards the vehicle 200, the processor 270 identifies a passenger boarding location or the number of boarded passengers through the passenger sensor 230. For example, the processor 270 may sense the passenger boarded the vehicle 200 based on information provided by at least one of the weight sensor, the vision sensor, the camera, the ultrasonic sensor, or the radar. The processor 270 may determine whether the boarded passenger is the person who made the reservation (a caller). For example, the processor 270 may receive the user identification information from the user terminal 100 through the Bluetooth, the NFC, and the like, and compare the received user identification information with the information about the person who made the reservation of the vehicle call information to identify the occupant.

When the passenger has finished boarding the vehicle 200, the processor 270 sets a traveling route by setting the alighting location as the destination based on the vehicle call information. In addition, the processor 270 controls the autonomous driving of the vehicle 200 to the destination along the set traveling route. The processor 270 may use one of known autonomous driving technologies.

When the vehicle 200 reaches the destination, the processor 270 executes a service usage end procedure of the user (the alighting passenger). The processor 270 determines whether the vehicle 200 has reached the destination based on the vehicle location measured by the location measuring device 210, the map data stored in the storage 260, and destination information of the vehicle call information. In addition, the processor 270 determines whether the vehicle 200 is stopped based on the vehicle speed or the brake status information. The processor 270 may identify the information about the occupant location in the vehicle 200 through the passenger sensor 230 to determine whether the passenger has alighted and identify a passenger alighted location (seat), or the number of alighted people. In other words, the processor 270 may determine the service usage end based on whether the destination has been reached, whether the vehicle is stopped, the occupant location information, or whether payment of service fee has been completed.

When the payment of the service fee is completed after arriving at the destination, the processor 270 captures an image of the interior of the vehicle 200 (a second vehicle interior image) by operating the vision sensor 250 at the second capturing time point based on whether the alighting passenger agreed to be captured. When the alighting passenger agreed to be captured, the processor 270 obtains the second vehicle interior image through the vision sensor 250 immediately before the alighting of the passenger. When the alighting passenger didn't agree to be captured, the processor 270 obtains the second vehicle interior image through the vision sensor 250 after the alighting of the passenger. The processor 270 may sense the time point immediately after the alighting of the passenger based on at least one of the door status information, the external button signal, information provided by the weight sensor, information provided by the ultrasonic sensor, information provided by the radar, and information provided by the vision sensor. When there is another passenger other than the alighting passenger in the vehicle 200 when capturing the second vehicle interior image, the processor 270 may protect personal information of another passenger by blurring or deleting a region matching a boarding location of the corresponding another passenger in the image captured by the vision sensor 250. The processor 270 transmits the captured second vehicle interior image to the server 300.

When receiving the request of the boarding reservation for the vehicle 200, that is, use of the shared mobility service from the user terminal 100, the server 300 allocates the vehicle 200, generates vehicle allocation information based on the assignment of the vehicle, and transmits the generated vehicle allocation information to the user terminal 100. The user terminal 100 displays the vehicle allocation information on a display screen to allow the user to identify the vehicle allocation information. The vehicle information includes a plate number of the allocated vehicle, a vehicle model, or the like. The server 300 generates the vehicle call information based on the boarding reservation information received from the user terminal 100 and transmits the vehicle call information to the allocated vehicle 200.

When receiving the first vehicle interior image and the second vehicle interior image transmitted by the vehicle 200, the server 300 stores the first vehicle interior image and the second vehicle interior image in a database (DB). The vehicle 200 may respectively transmit the first vehicle interior image and the second vehicle interior image immediately at the time points at which the first vehicle interior image and the second vehicle interior image are respectively captured, or may transmit the first vehicle interior image and the second vehicle interior image at once after the capturing.

The server 300 compares and analyzes the first vehicle interior image and the second vehicle interior image to determine (sense) whether there is a lost item in the vehicle. In this connection, the lost item may be passenger's belongings, a garbage, or a trash. When the sensed lost item is the belongings of the alighting passenger, the server 300 transmits lost item information including a fact that the lost item is sensed, a kind of the lost item, a picture of the lost item, or a method for finding the lost item, and the like to the user terminal 100 of the passenger who has just alighted. At this time, the server 300 may also transmit the lost item information to a business operator. Further, the server 300 may register the lost item information in a lost-and-found. The server 300 may transmit a notification requesting disposal of the garbage or the trash to the business operator only when the sensed lost item is the garbage or the trash.

Figure 3:
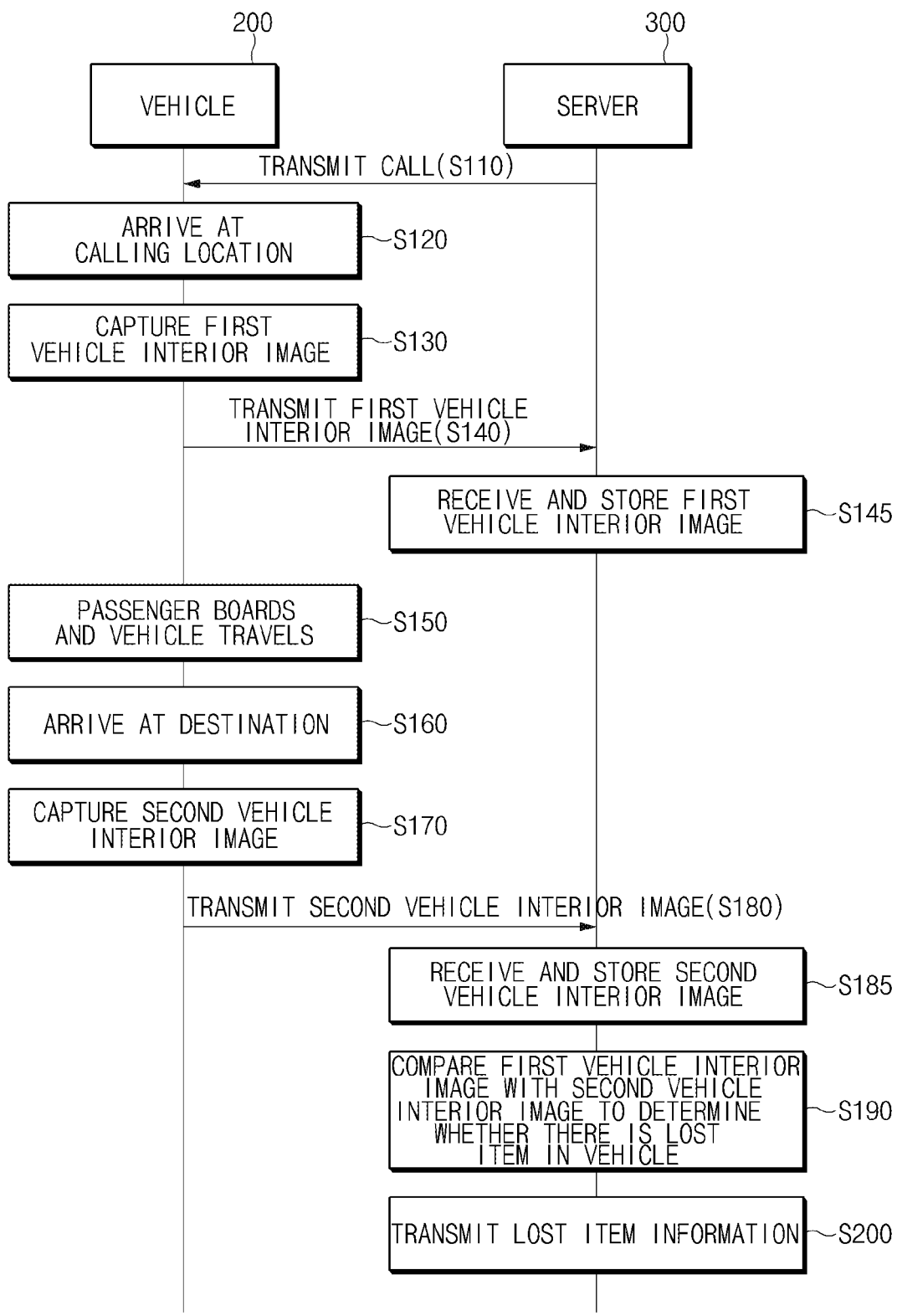
FIG. 3 is a flowchart illustrating a method for handling a lost item in an autonomous vehicle according to one embodiment of the present disclosure.

FIG. 3 is a flowchart illustrating a method for monitoring in a vehicle according to one embodiment of the present disclosure.

Referring to FIG. 3, the vehicle 200 receives the vehicle call transmitted from the server 300 (S110). The user terminal 100 may request the use of the shared mobility service to the server 300 based on the user input. In other words, the user may connect to the server 300 through the user terminal 100 to make the reservation of the boarding of the shared vehicle. The user terminal 100 transmits the boarding reservation information to the server 300 when making the reservation of the boarding of the shared vehicle. The server 300 allocates the vehicle 200 based on the request of the user terminal 100, that is, the boarding reservation information, and transmits the vehicle allocation information (e.g., the vehicle plate number, the vehicle model, and the like) to the user terminal 100. In addition, the server 300 generates the vehicle call information based on the boarding reservation information and transmits the vehicle call information to the allocated vehicle 200.

When arriving at the calling location of the user (the person to be boarded) (S120), the vehicle 200 captures the first vehicle interior image using the vision sensor 250 when the user boards the vehicle 200 (S130). The vehicle 200 arrives at the calling location, stops, and then captures the first vehicle interior image at the first capturing time point. The vehicle 200 may determine the first capturing time point through the detector 220 and the passenger sensor 230. When another passenger exists in the vehicle 200, the vehicle 200 may protect the personal information of another passenger by blurring or deleting the region matching the corresponding another passenger in the first vehicle interior image captured by the vision sensor 250. In addition, when the passenger boards the vehicle 200, the vehicle 200 may determine whether the corresponding passenger is the person who made the reservation through the wireless communication with the user terminal 100 of the passenger.

The vehicle 200 transmits the captured first vehicle interior image to the server 300 (S140). The server 300 receives the first vehicle interior image and stores the received first vehicle interior image in the database (DB) (S145).

When the passenger boards (rides) the vehicle 200, the vehicle 200 travels along the traveling route to the destination (S150). When the passenger boards the vehicle 200, the vehicle 200 searches for the traveling route to the destination based on the location measuring device 210 and the map data, and autonomously travels along the found traveling route.

When arriving at the destination (S160), the vehicle 200 captures the second vehicle interior image (S170). The vehicle 200 may determine whether the destination has been reached using the location measuring device 210 and the map data. In addition, the vehicle 200 may determine whether the vehicle is stopped based on the vehicle speed or the brake information. The vehicle 200 determines that the destination has been reached when a stop location corresponds to the destination. When arriving at the destination, the vehicle 200 captures the second vehicle interior image at the second capturing time point. The vehicle 200 may determine the second capturing time point through the detector 220 and the passenger sensor 230. When there is another passenger other than the alighting passenger in the vehicle 200, the vehicle 200 blurs or deletes the region matching the corresponding another passenger in the second vehicle interior image captured by the vision sensor 250.

The vehicle 200 transmits the captured second vehicle interior image to the server 300 (S180). The server 300 receives the second vehicle interior image and stores the received second vehicle interior image in the database (DB) (S185). In the present embodiment, it is described that the vehicle 200 immediately transmits the first vehicle interior image and the second vehicle interior image to the server 300 when obtaining the first vehicle interior image and the second vehicle interior image, but the present disclosure is not limited thereto. The vehicle 200 may be implemented to transmit, to the server 300, the first vehicle interior image and the second vehicle interior image at once after obtaining both the first vehicle interior image and the second vehicle interior image.

The server 300 compares and analyzes the first vehicle interior image and the second vehicle interior image to determine (sense) whether there is the lost item in the vehicle (S190). In this connection, the lost item may be the belongings of the passenger, the garbage, or the trash.

The server 300 transmits the lost item information to the user terminal 100 of the alighting passenger when the lost item in the vehicle is sensed (S200). When the sensed lost item is the belongings of the alighting passenger, the server 300 transmits the lost item information including the fact that the lost item is sensed, the kind of the lost item, the picture of the lost item, or the method for finding the lost item, and the like to the user terminal 100 of the passenger (an owner of the lost item) who has just alighted. Further, the server 300 may register, for example, in the DB, the lost item information in the lost-and-found. The server 300 may transmit the notification requesting the disposal of the garbage or the trash to the business operator when the sensed lost item is the garbage or the trash. In the present embodiment, it is described that the notification is transmitted to the business operator only when the lost item in the vehicle is the garbage or the trash. However, it may be implemented that the lost item information is transmitted to the business operator along with the user terminal 100 of the alighting passenger when the lost item in the vehicle, that is, at least one of the belongings of the passenger, the garbage, and the trash is sensed.

Figure 4:
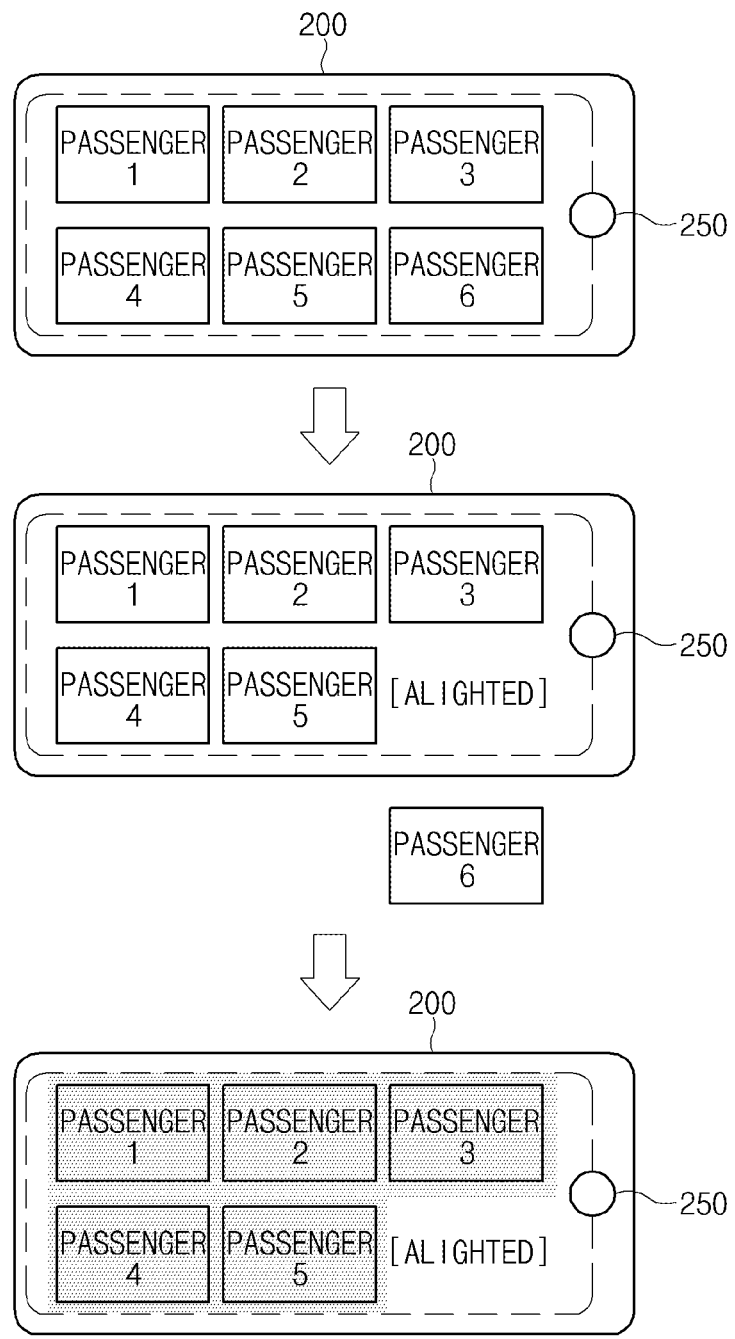
FIGS. 4 and 5 are exemplary views for describing a method for processing an image associated with the present disclosure.
Figure 5:
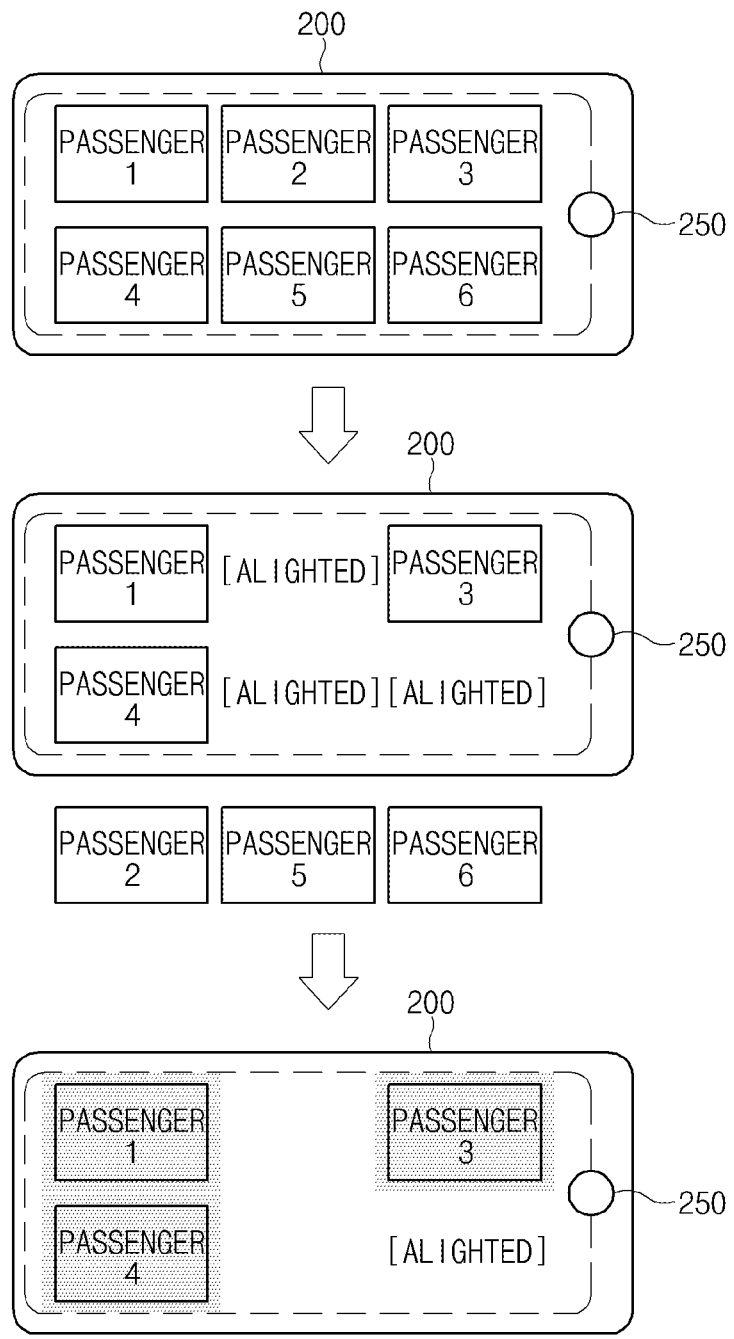

FIGS. 4 and 5 are exemplary views for describing a method for processing an image associated with the present disclosure. The present embodiment describes a method for capturing and processing (filtering) the vehicle interior image to protect the personal information of another passenger when another passenger exists in the vehicle when the passenger alights.

Referring to FIG. 4, in a state in which 6 passengers, that is, a passenger 1, a passenger 2, a passenger 3, a passenger 4, a passenger 5, and a passenger 6 boarded the vehicle 200, when the passenger 6 alights, the vehicle 200 captures a vehicle interior image through the vision sensor 250. In this connection, the vision sensor 250 may block the passenger 1, the passenger 2, the passenger 3, the passenger 4, and the passenger 5 to select only spatial information of a location where the passenger 6 boarded.

Referring to FIG. 5, when three passengers, that is, the passenger 2, the passenger 5, and the passenger 6 alight from the vehicle 200 in the state in which the 6 passengers are boarded the vehicle 200, the vehicle 200 determines whether other passengers exist in the vehicle. When there are other passengers in the vehicle, the vehicle 200 identifies boarding locations of the corresponding passengers, that is, the passenger 1, the passenger 3, and the passenger 4. The vehicle 200 blocks regions corresponding to the boarding locations of other passengers identified in a vehicle interior image obtained by the vision sensor 250.

Figure 6:
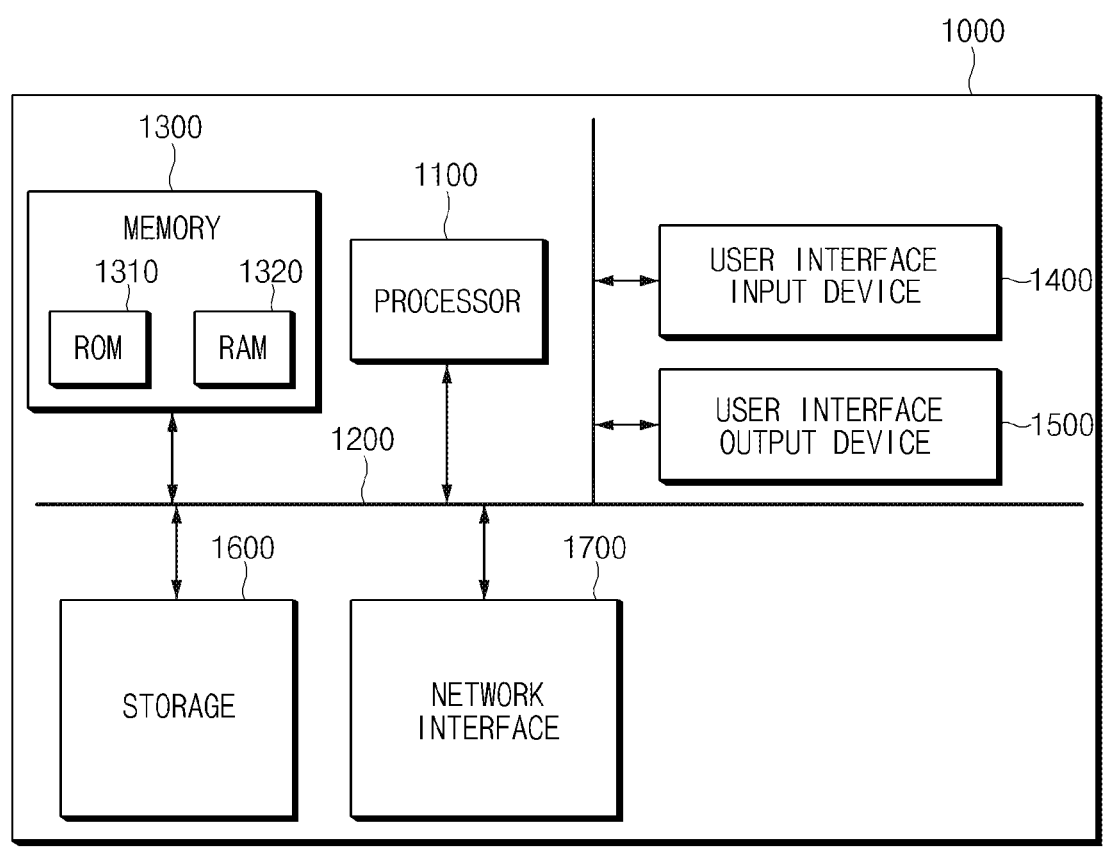
FIG. 6 is a block diagram illustrating a computing system that executes a method for handling a lost item in an autonomous vehicle according to one embodiment of the present disclosure.

FIG. 6 is a block diagram illustrating a computing system that executes a method for handling a lost item in an autonomous vehicle according to one embodiment of the present disclosure.

With reference to FIG. 6, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in a hardware or a software module executed by the processor 1100, or in a combination thereof. The software module may reside on a storage medium (that is, the memory 1300 or the storage 1600) such as a RAM, a flash memory, a ROM, an EPROM, an EEPROM, a register, a hard disk, a removable disk, a CD-ROM. The storage medium may be any non-transitory storage medium. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, the vehicle interior images are obtained and compared with each other before the vehicle boarding of the passenger and after the alighting of the passenger from the vehicle, so that the lost item in the vehicle may be sensed by monitoring the interior of the vehicle so as not to violate privacy regulations.

In addition, according to the present disclosure, when another occupant exists in the vehicle when the passenger boards or alights from the vehicle, the region where another occupant is located is blocked, so that the personal information of another occupant may be protected.

In addition, according to the present disclosure, when the lost item in the vehicle is sensed, the lost item information is provided to the owner of the sensed lost item. Thus, the lost item may be handled, so that the shared mobility service may be operated unmanned.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for handling a lost item in an autonomous vehicle, the system comprising:
the vehicle including a vision sensor configured to respectively capture a first vehicle interior image and a second vehicle interior image when a passenger boards and alights from the vehicle, the vehicle configured to transmit the captured first vehicle interior image and second vehicle interior image to a server; and
the server configured to compare the first vehicle interior image with the second vehicle interior image and to transmit lost item information to a user terminal associated with the passenger when the lost item in the vehicle is sensed,
wherein the vehicle is configured to determine, based on whether the passenger agreed, a time point before the boarding or after the boarding as a first capturing time point, and a time point after the alighting or before the alighting as a second capturing time point.

2. The system of claim 1, wherein the vehicle is configured to blur or delete a region matching a boarding location of another passenger in the first vehicle interior image in a state where the another passenger is boarded the vehicle at the first capturing time point.

3. The system of claim 1, wherein the vehicle is configured to blur or delete a region matching a boarding location of another passenger in the second vehicle interior image in a state where the another passenger is boarded the vehicle at the second capturing time point.

4. The system of claim 1, wherein the vehicle is configured to determine whether the vehicle has arrived at a calling location based on a vehicle location.

5. The system of claim 4, wherein the vehicle is configured to determine whether the vehicle has arrived at the calling location additionally based on at least one of a vehicle speed and/or brake state information.

6. The system of claim 1, wherein the vehicle is configured to sense a time point before the boarding of the passenger based on door status information.

7. The system of claim 1, wherein the vehicle is configured to sense the passenger based on information provided by at least one of a weight sensor, the vision sensor, a camera, an ultrasonic sensor, and/or a radar.

8. The system of claim 1, wherein the vehicle is configured to determine service end of the passenger based on completion of service fee payment and occupant location information.

9. The system of claim 1, wherein the vehicle is configured to determine a time point after the alighting of the passenger, based on at least one of door status information, an external button signal, information provided by a weight sensor, information provided by an ultrasonic sensor, information provided by a radar, and/or information provided by the vision sensor.

10. The system of claim 1, wherein the server is configured to transmit the lost item information to a business operator when the lost item in the vehicle is sensed.

11. The system of claim 10, wherein the lost item in the vehicle is at least one of belongings of the passenger, a trash, and/or a garbage.

12. A method for handling a lost item in an autonomous vehicle, the method comprising:
a first step of receiving, by a server, a first vehicle interior image and a second vehicle interior image respectively captured through a vision sensor when a passenger boards and alights from the vehicle;
a second step of comparing, by the server, the first vehicle interior image with the second vehicle interior image and to sense the lost item in the vehicle; and
a third step of transmitting, by the server, lost item information to a user terminal associated with the passenger,
wherein the first step includes:
determining a time point before the boarding or after the boarding as a first capturing time point based on whether the passenger agreed to be captured; and determining a time point after the alighting or before the alighting as a second capturing time point based on whether the passenger agreed to be captured.

13. The method of claim 12, wherein the first step includes:
blurring or deleting a region matching a boarding location of another passenger in the first vehicle interior image when the another passenger exists in the vehicle at the first capturing time point.

14. The method of claim 12, wherein the first step includes:
blurring or deleting a region matching a boarding location of another passenger in the second vehicle interior image in a state where the another passenger is boarded the vehicle at the second capturing time point.

15. The method of claim 12, wherein the first step includes:
determining, by the vehicle, whether the vehicle has arrived at a calling location based on a vehicle location.

16. The method of claim 15, wherein the first step further includes:
determining, by the vehicle, whether the vehicle has arrived at the calling location additionally based on at least one of a vehicle speed and/or brake state information.

17. The method of claim 12, wherein the first step includes:
sensing, by the vehicle, a time point before the boarding of the passenger based on door status information.

18. The method of claim 12, wherein the first step includes:
sensing, by the vehicle, the passenger based on information provided by at least one of a weight sensor, the vision sensor, a camera, an ultrasonic sensor, and/or a radar.

19. The method of claim 12, wherein the first step includes:
determining, by the vehicle, service end of the passenger based on completion of service fee payment and occupant location information.

20. The method of claim 12, wherein the first step further includes:
sensing a time point after the alighting of the passenger, by the vehicle, based on at least one of door status information, an external button signal, information provided by a weight sensor, information provided by an ultrasonic sensor, information provided by a radar, and/or information provided by the vision sensor.

21. The method of claim 12, wherein the first step further includes:
transmitting, by the server, the lost item information to a business operator when the lost item in the vehicle is sensed.

22. The method of claim 21, wherein the lost item in the vehicle is at least one of belongings of the passenger, a trash, and/or a garbage.

23. A system for handling a lost item in an autonomous vehicle, the system comprising:
the vehicle including a vision sensor configured to respectively capture a first vehicle interior image and a second vehicle interior image when a passenger boards and alights from the vehicle, the vehicle configured to transmit the captured first vehicle interior image and second vehicle interior image to a server; and
the server configured to compare the first vehicle interior image with the second vehicle interior image and to transmit lost item information to a user terminal associated with the passenger when the lost item in the vehicle is sensed,
wherein the vehicle is configured to determine whether the vehicle has arrived at a calling location based on a vehicle location and also based on at least one of a vehicle speed and/or brake state information.

* * * * *